United States Patent
Ohnishi

(10) Patent No.: US 8,348,340 B2
(45) Date of Patent: Jan. 8, 2013

(54) SEAT STRUCTURE

(75) Inventor: Ichiro Ohnishi, Nara (JP)

(73) Assignee: Aprica Children's Products Inc., Osaka (JP)

( * ) Notice: Subject to any disclaimer, the term of this patent is extended or adjusted under 35 U.S.C. 154(b) by 0 days.

(21) Appl. No.: 13/370,104

(22) Filed: Feb. 9, 2012

(65) Prior Publication Data

US 2012/0139316 A1    Jun. 7, 2012

Related U.S. Application Data

(62) Division of application No. 12/592,098, filed on Nov. 18, 2009, now abandoned.

(30) Foreign Application Priority Data

Dec. 18, 2008  (JP) .................................. 2008-321928
Oct. 23, 2009  (JP) .................................. 2009-244842

(51) Int. Cl.
   *A47C 3/00* (2006.01)
(52) U.S. Cl. ................................ 297/284.9; 297/256.13
(58) Field of Classification Search ............... 297/284.9, 297/256.13, 256.15
   See application file for complete search history.

(56) References Cited

U.S. PATENT DOCUMENTS

| | | | |
|---|---|---|---|
| 5,246,272 A | 9/1993 | Kato | |
| 5,681,084 A | 10/1997 | Yoshifumi | |
| 5,803,535 A | 9/1998 | Cabagnero | |
| 6,416,077 B1 | 7/2002 | Chen | |
| 6,485,101 B2 * | 11/2002 | Kassai et al. ............... 297/250.1 |
| 6,890,031 B2 * | 5/2005 | Rhein ........................ 297/284.9 |
| 6,896,326 B2 | 5/2005 | Chen | |
| 6,938,914 B2 * | 9/2005 | Kassai et al. .................. 280/642 |
| 7,066,549 B2 | 6/2006 | Dennon et al. | |
| 7,100,988 B1 * | 9/2006 | Hyslop ........................ 297/376 |
| 7,313,836 B1 | 1/2008 | Swezey et al. | |
| 7,658,448 B2 * | 2/2010 | Birk et al. ................ 297/354.12 |

FOREIGN PATENT DOCUMENTS

| | | |
|---|---|---|
| DE | 203 07 191 | 8/2003 |
| EP | 0 708 009 | 4/1996 |
| EP | 0 853 018 | 7/1998 |
| JP | 2007055462 | 8/2007 |

OTHER PUBLICATIONS

Extended European Search Report issued in related European Application No. EP 09177825.8 mailed Mar. 4, 2010.

* cited by examiner

*Primary Examiner* — David Dunn
*Assistant Examiner* — Erika Garrett
(74) *Attorney, Agent, or Firm* — Lempia Summerfield Katz LLC

(57) ABSTRACT

A seat structure has a main body and a seating surface element attached to the main body extending in a longitudinal direction. A back element is connected to a rear end of the seating surface element and is reclinable and extends in a vertical direction. The back element includes a back plate and a pair of back rods respectively positioned on both lateral sides of said back plate. An upper end flap is connected to an upper end of the back plate in a forward tiltable manner. A displacement member is supported on the back rods and is vertically displaceable. A first connection element connects the displacement member and upper end flap to tilt the upper end flap forward according to displacement of the displacement member.

12 Claims, 6 Drawing Sheets

PRIOR ART

SEAT STRUCTURE

RELATED APPLICATION DATA

This patent is a division of U.S. patent application Ser. No. 12/592,098 filed Nov. 18, 2009 and entitled "Seat Structure." The entire contents of this parent application are hereby incorporated by reference herein.

BACKGROUND

1. Field of the Disclosure

The present invention relates to seat structures, and more particularly, to seat structures that are switchable between a chair form and a bed form 2. Description of Related Art FIGS. 10 and 11 illustratively show an example of seat structures switchable between a chair form (FIG. 10) and a bed form (FIG. 11). The seat structure includes: a seat main body 1; a seating surface element 2 attached to the seat main body 1, and extending in a longitudinal direction; a back element 3 connected to a rear end of the seating surface element 2 in a reclinable manner, and extending in a vertical direction; and an upper end flap (a head guard) 4 connected to an upper end of the back element 3 in a forward tiltable manner. In the chair form of FIG. 10, the upper end flap 4 is located in substantially the same plane as that of the back element 3. In the bed form of FIG. 11, the upper end flap 4 is tilted forward and lifted with respect to the back element 3.

Such a seat structure is disclosed in, e.g., Japanese Publication No. 2007-55462 of unexamined patent applications. Japanese Publication No. 2007-55462 of unexamined patent applications discloses a baby carriage that is switchable between a forward facing state where an infant sitting in the baby carriage faces forward, and a rearward facing state where the infant faces rearward so as to face a person pushing the baby carriage. This baby carriage is preferable in terms of safety, because the upper end flap 4 covers the top of the head of the infant sitting in the seat when the seat of the baby carriage is switched to the bed form.

The seat structure of the baby carriage disclosed in Japanese Publication No. 2007-55462 of unexamined patent applications has a lifting mechanism for lifting the upper end flap, in addition to a reclining adjustment mechanism for the back element. The lifting mechanism includes a rotation member, a rod bar, and inhibiting means. The rotation member is provided on the back surface of the back element, has its center movable about the rotation center of the back element, and is rotatable about the center of the rotation member itself. The rod bar connects the rotation member and the upper end flap. The inhibiting means inhibits rotation of the rotation member when the tilt angle of the back element reaches a predetermined value. While the back element is being tilted toward the predetermined tilt angle, the rod bar is pressed toward the rotation member by an urging force of urging means, and the rotation member is rotated about its center, whereby the upper end flap extends in the extending direction of the back element. When the tilt angle of the back element reaches the predetermined value, rotation of the rotation member is inhibited, and the rod bar lifts the upper end flap with respect to the back element against the urging force of the urging means.

Since the lifting mechanism for the upper end flap disclosed in Japanese Publication No. 2007-55462 of unexamined patent applications has a somewhat complex structure, a simpler structure is desired.

SUMMARY

It is an object of the present invention to provide a seat structure capable of lifting an upper end flap by a simple structure.

A seat structure according to the present invention includes: a seat main body; a seating surface element attached to the seat main body, and extending in a longitudinal direction; a back element connected to a rear end of the seating surface element in a reclinable manner, and extending in a vertical direction; an upper end flap connected to an upper end of the back element in a forward tiltable manner; a displacement member supported on the back element in a vertically displaceable manner; and a first connection element connecting the displacement member and the upper end flap so as to tilt the upper end flap forward according to displacement of the displacement member.

According to the above structure, the upper end flap can be lifted by displacing the displacement member downward according to reclining of the back element.

In a preferred embodiment, the seat structure further includes a second connection element connecting a fixed point on the seat main body and the displacement member, in addition to the above components. A positional relation among the fixed point on the seat main body, the displacement member, the first connection element, and the second connection element is selected so that the upper end flap and the back element are located in substantially a same plane when the back element is in a lifted state, and the upper end flap is tilted forward and lifted with respect to the back element when the back element is in a reclined state in a bed form.

Preferably, the displacement member and the second connection element form a reclining mechanism for determining a reclining angle of the back element.

Preferably, the first connection element is a bendable member. In one embodiment, the first connection element is a flexible linear member. In another embodiment, the first connection element is a plurality of link members connected in a bendable manner.

Preferably, the second connection element is an unbendable rigid member. In a preferred embodiment, the back element has a guide portion for passing the first connection element thereon.

The seat structure according to one embodiment further includes an urging member for urging the upper end flap so as to restore the upper end flap to a position where the upper end flap is located in a same plane as that of the back element. An example of the urging member is a torsion spring attached to a pivot shaft of the upper end flap.

The back element includes, e.g., a back plate, and a pair of back rods respectively positioned on both lateral sides of the back plate. In this case, it is preferable that the upper end flap be pivotally connected to an upper end of the back plate, and the displacement member be supported on the pair of back rods in a displaceable manner.

An example having any of the above seat structures is a nursery equipment. Examples of the nursery equipment include a baby carriage, an infant indoor chair, a child car seat, and the like.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

Figure 1:
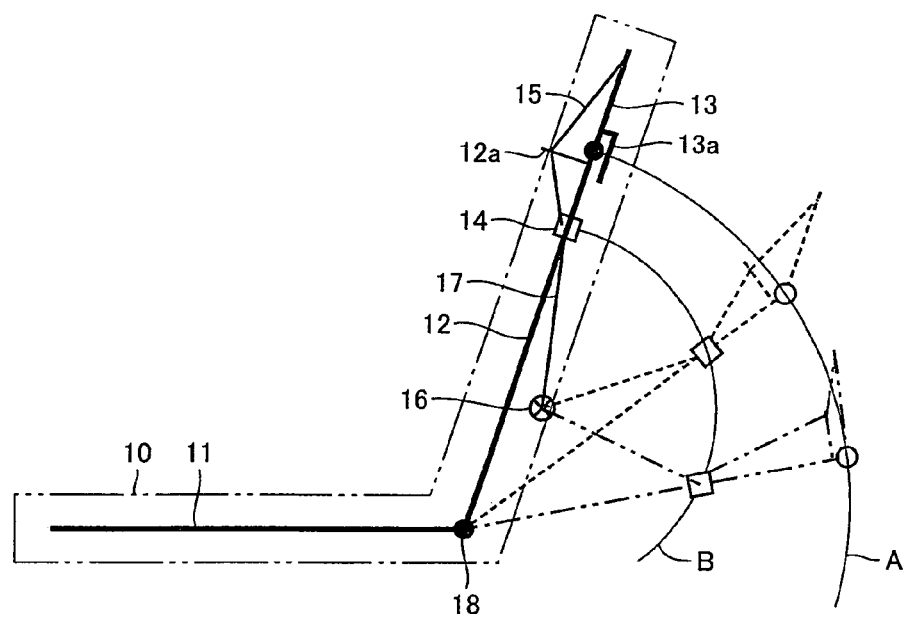
FIG. 1 is an illustration of an embodiment of the present invention in a chair form.
Figure 2:
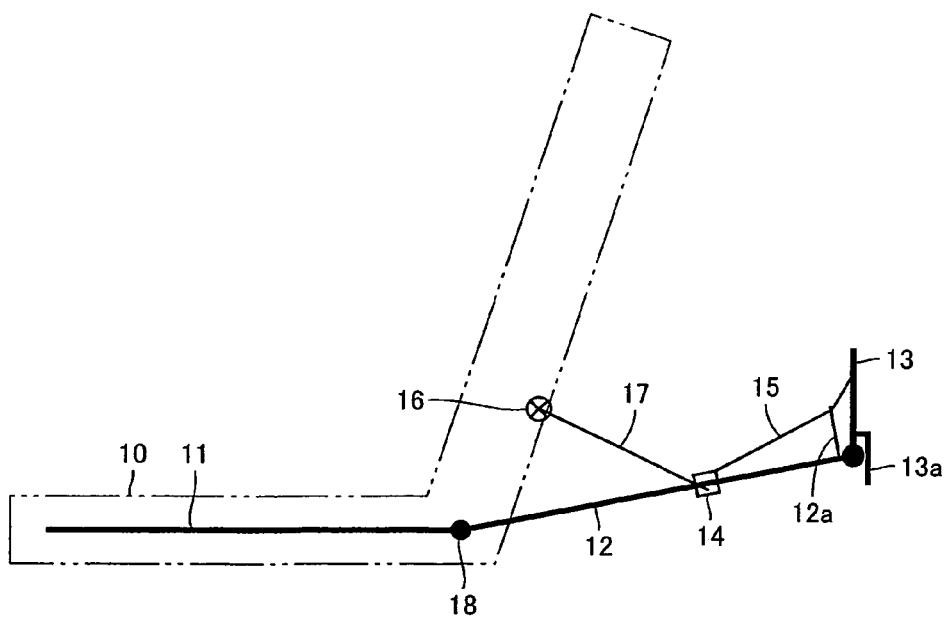
FIG. 2 is an illustration of the embodiment of the present invention in a bed form.

FIGS. 1 and 2 are illustrations showing an embodiment of the present invention. A seat structure shown in the figures is used for, e.g., nursery equipments, such as a baby carriage, and is switchable between a chair form shown in FIG. 1 and a bed form shown in FIG. 2.

The seat structure includes: a seat main body 10 formed by a body frame of a baby carriage, or the like; a seating surface element 11 attached to the seat main body 10, and extending in a longitudinal direction; a back element 12 connected to a rear end of the seating surface element 11 through a pivot shaft 18 in a reclinable manner, and extending in a vertical direction; an upper end flap 13 connected to an upper end of the back element 12 in a forward tiltable manner; a displacement member 14 supported on the back element 12 in a vertically displaceable manner; and a first connection element 15 connecting the displacement member 14 and the upper end flap 13 so as to tilt the upper end flap 13 forward according to displacement of the displacement member 14.

When the seat structure is in the chair form with the back element 12 being in a lifted state, the upper end flap 13 is located in substantially the same plane as that of the back element 12. On the other hand, as shown in FIG. 2, when the back element 12 is in a reclined state in the bed form, the upper end flap 13 is tilted forward and lifted with respect to the back element 12 to cover the top of the head of an infant sitting in the seat.

The upper end flap 13 has a hanging piece 13a extending downward on its back surface. The hanging piece 13a has such a length that the hanging piece 13a overlaps the back surface of the upper end of the back element 12. Thus, when the upper end flap 13 tries to pivot clockwise from the state of FIG. 1, the hanging piece 13a contacts the back surface of the back element 12, inhibiting further pivoting of the upper end flap 13. It is to be understood that the hanging piece 13a is merely an example for inhibiting rearward pivoting of the upper end flap 13, and other structures may be used.

The displacement member 14 is displaceably, e.g., slidably supported on the back element 12. An upper part of the upper end flap 13 and the displacement member 14 are connected through the first connection element 15. Thus, the upper end flap 13 pivots forward as the displacement member 14 is moved downward from the state of FIG. 1. Thus, by moving the displacement member 14 downward when reclining the back element 12 to the bed form, the upper end flap 13 is lifted with respect to the upper end of the back element 12 that extends substantially horizontally, as shown in FIG. 2.

Figure 3:
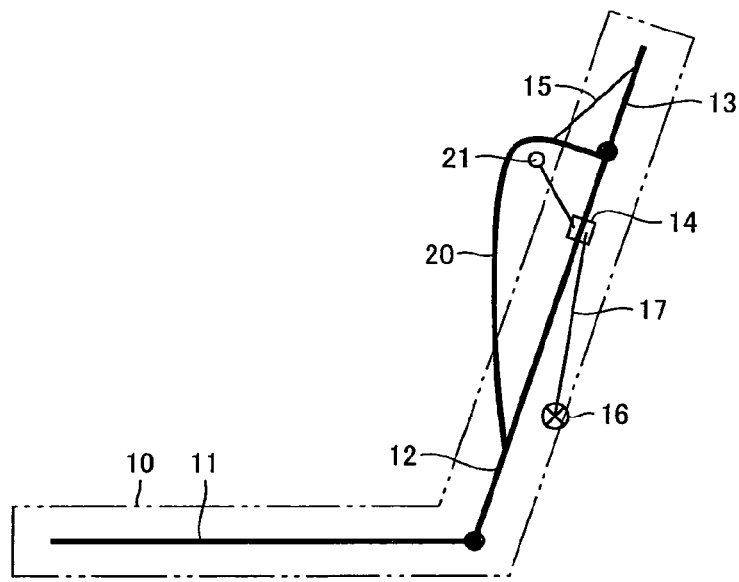
FIG. 3 is an illustration of another embodiment of the present invention in a chair form.
Figure 4:
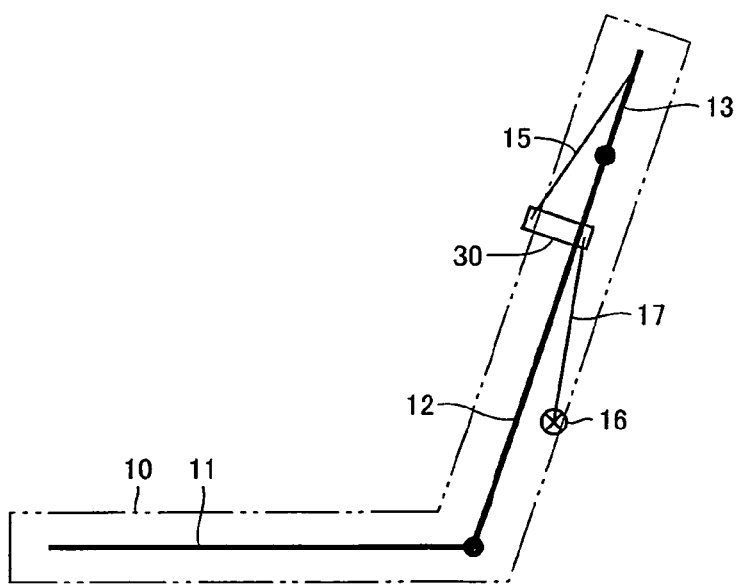
FIG. 4 is an illustration of still another embodiment of the present invention in a chair form.

In order to facilitate the forward pivoting operation of the upper end flap 13, a pillar portion 12a, which has a guide portion for passing the first connection element 15 thereon, may be provided in an upper part of the back element 12. In another embodiment, as shown in FIG. 3, forward protruding sidewall portions 20 may be provided on both side edges of the back element 12, respectively, and a guide portion 21 for passing the first connection element 15 thereon may be provided in each sidewall portion 20. In still another embodiment, as shown in FIG. 4, the height of a displacement member 30 may be increased, and an upper end part of the displacement member 30 and the upper end flap 13 may be connected.

Preferably, the first connection element 15 is a bendable member. In one embodiment, the first connection element is a flexible linear member, such as a string or a belt. In another embodiment, the first connection element is formed by a plurality of link members connected in a bendable manner.

Figure 5:
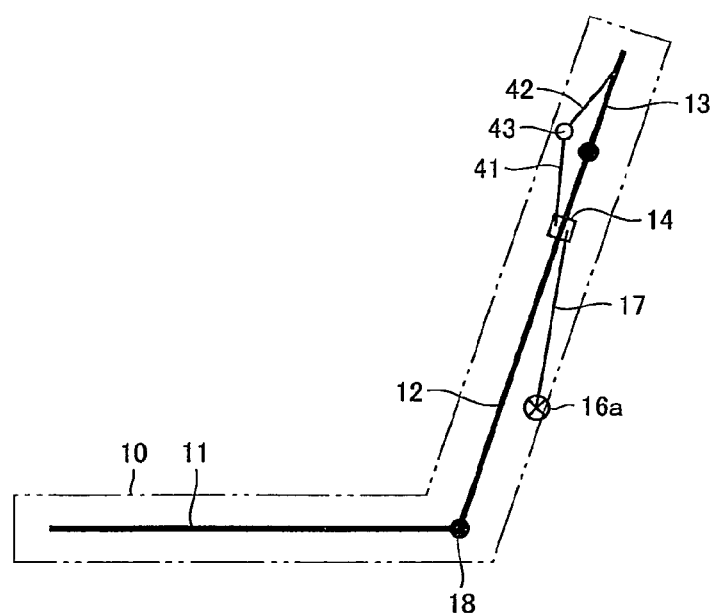
FIG. 5 is an illustration of a further embodiment of the present invention in a chair form.
Figure 6:
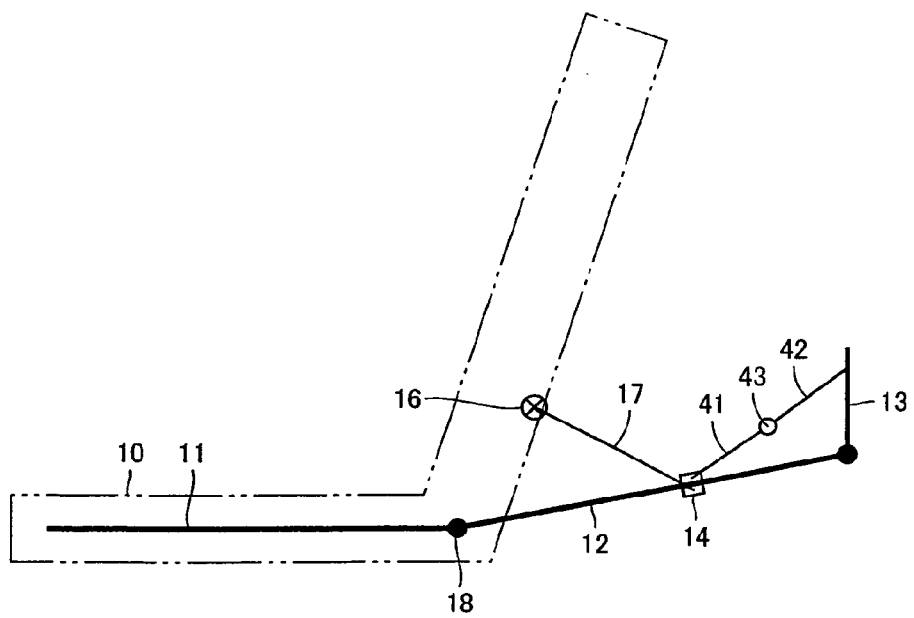
FIG. 6 is an illustration of the further embodiment of the present invention in a bed form.

FIGS. 5 and 6 illustratively show an embodiment in which the first connection element is formed by a plurality of link members 41, 42. One link member 41 has its one end connected to the displacement member 14, and the other end connected to one end of the other displacement member 42 through a connection shaft 43. The other end of the other link member 42 is connected to the upper part of the upper end flap 13. In the chair form of FIG. 5, the two link members 41, 42 are positioned in a slightly bent state. In the bed form of FIG. 6, however, since the displacement member 14 is moved downward, the two link members 41, 42 are positioned linearly, pulling the upper end flap 13 forward to a lifted state.

In the embodiments shown in FIGS. 1 through 6, the displacement member 14, 30 and a fixed point 16 on the seat main body 10 are connected by a second connection element 17. The second connection element 17 is preferably an unbendable rigid member. The displacement member 14, 30 and the second connection element 17 form a reclining mechanism for determining the reclining angle of the back element 12.

In another embodiment, a reclining mechanism for the back element 12 may be separately provided instead of providing the second connection element 17. In this case, a known mechanism may be used as the reclining mechanism.

An operation of lifting the upper end flap will be described with reference to the embodiment shown in FIGS. 1 and 2. The back element 12 is pivotable about the pivot shaft 18 that is located at the junction between the back element 12 and the seating surface element 11. Thus, the upper end of the back element 12 moves along a circular orbit A about the pivot shaft 18. The displacement member 14 pivots about the fixed point 16 on the seat main body 10. Thus, the displacement member 14 moves along a circular orbit B about the fixed point 16.

By fixing the position of the displacement member 14 on the back element 12, a triangle formed by a line connecting the displacement member 14, the fixed point 16, and the pivot shaft 18 is fixed, whereby the reclining angle of the back element 12 is fixed.

While the back element 12 is gradually reclined from the state of FIG. 1, the displacement member 14 starts sliding downward along the back element 12 when the reclining angle exceeds a predetermined value. As the displacement member 14 slides downward, the upper end flap 13 is pulled by the first connection element 15 to pivot forward. In the bed state of FIG. 2, the upper end flap 13 is lifted with respect to the back element 12 that extends substantially horizontally.

Figure 7:
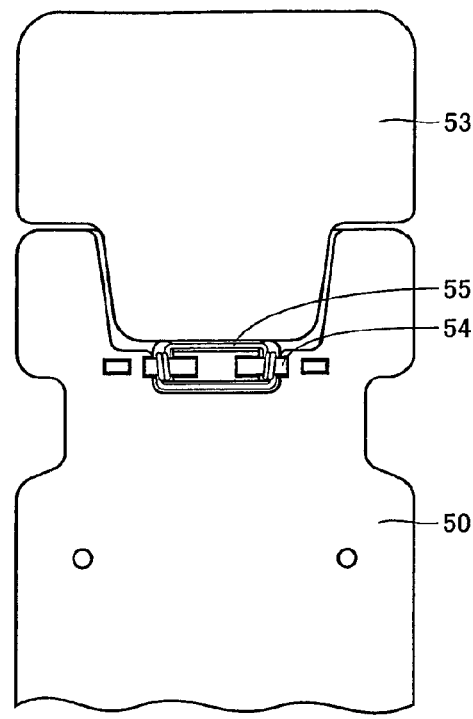
FIG. 7 is a front view showing an example of a back plate and an upper end flap.
Figure 8:
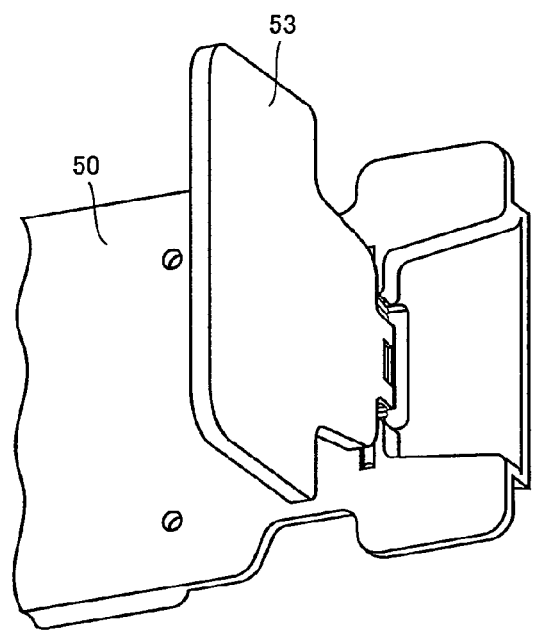
FIG. 8 is a perspective view showing a state where the upper end flap is lifted with respect to the back plate.
Figure 9:
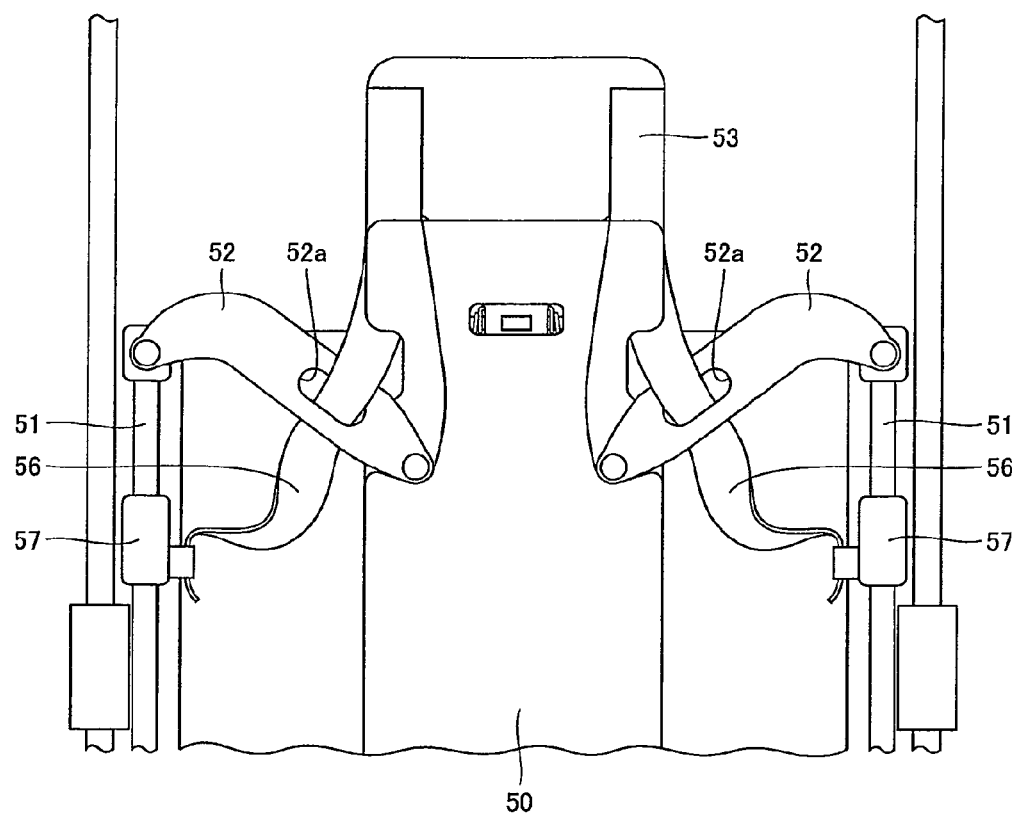
FIG. 9 is a back view showing a connection state between the upper end flap and each displacement member on each back rod.
Figure 10:
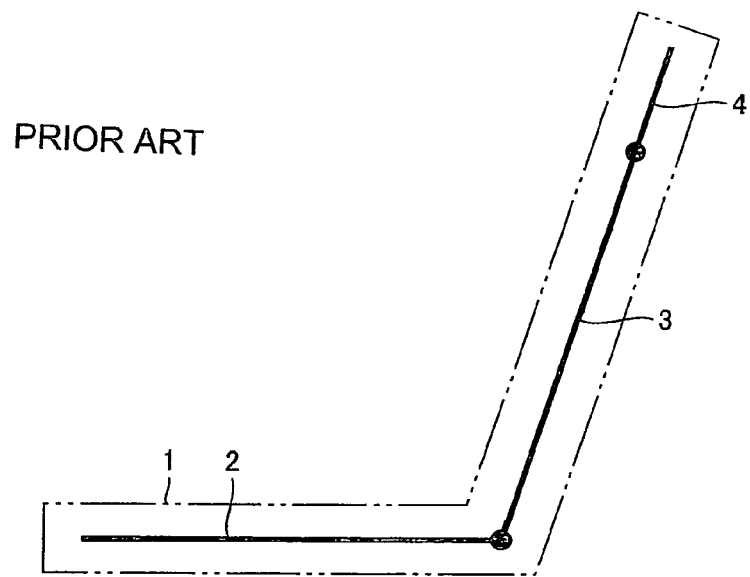
FIG. 10 is an illustration of a seat structure in a chair form.
Figure 11:
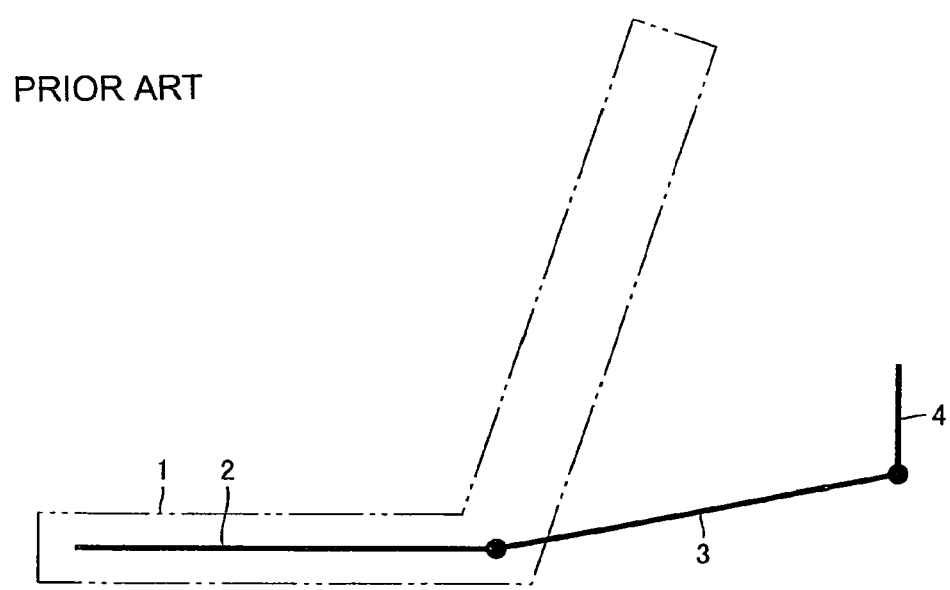
FIG. 11 is an illustration of the seat structure in a bed form.

FIGS. 7 through 9 show an example of a specific structure of the seat structure according to the present invention. In the seat structure shown in these figures, the back element includes: a back plate 50; a pair of back rods 51 positioned away from each other on both lateral sides of the back plate 50, respectively; and connection plates 52 each connecting the back plate 50 and a corresponding one of the back rods 51.

An upper end flap 53 is connected to an upper end of the back plate 50 through a pivot shaft 54 in a forward tiltable manner. A torsion spring 55 is attached to the pivot shaft 54 as an urging member for urging the upper end flap 53 so as to restore the upper end flap 53 to a position where the upper end flap 53 is located in the same plane as that of the back plate 50.

As shown in FIG. 9, vertically displaceable displacement members 57 are respectively attached to the pair of back rods 51. The upper end flap 53 and the displacement members 57 are respectively connected by connection belts 56 so as to tilt the upper end flap 53 forward according to displacement of the displacement members 57. The connection belts 56 respectively pass through holes 52a in the connection plates 52.

As described above, according to the present invention, the upper end flap can be easily lifted by a very simple structure.

Although embodiments of the present invention have been described with reference to the drawings, the present invention is not limited to the illustrated embodiments. Various modifications and variations can be made to the illustrated embodiments within the same scope as, or an equivalent scope to, the present invention.

The present invention can be advantageously used for seat structures that are switchable between a chair form and a bed form.

What is claimed is:

1. A seat structure, comprising:
   a seat main body;
   a seating surface element attached to said seat main body, and extending in a longitudinal direction;
   a back element connected to a rear end of said seating surface element in a reclinable manner, and extending in a vertical direction, said back element includes a back plate and a pair of back rods respectively positioned on both lateral sides of said back plate;
   a pair of connection plates each having a hole and connecting the back plate and a corresponding one of the pair of back rods;
   an upper end flap connected to an upper end of said back plate in a forward tiltable manner;
   a displacement member supported on said pair of back rods in a vertically displaceable manner;
   a first connection element having a pair of connection belts each passing respectively through the hole in a corresponding one of the pair of connecting plates; and
   said first connection element connecting said displacement member and said upper end flap so as to tilt said upper end flap forward according to displacement of said displacement member.

2. The seat structure according to claim 1, further comprising:
   a second connection element connecting a fixed point on said seat main body and said displacement member, wherein a positional relation among said fixed point on said seat main body, said displacement member, said first connection element, and said second connection element is selected so that said upper end flap and said back element are located in substantially a same plane when said back element is in a lifted state, and said upper end flap is tilted forward and lifted with respect to said back element when said back element is in a reclined state in a bed form.

3. The seat structure according to claim 2, wherein said displacement member and said second connection element form a reclining mechanism for determining a reclining angle of said back element.

4. The seat structure according to claim 2, wherein said second connection element is an unbendable rigid member.

5. The seat structure according to claim 1, wherein said first connection element is a bendable member.

6. The seat structure according to claim 5, wherein said first connection element is a flexible linear member.

7. The seat structure according to claim 5, wherein said first connection element is a plurality of link members connected in a bendable manner.

8. The seat structure according to claim 1, wherein said back element has a guide portion for passing said first connection element thereon.

9. The seat structure according to claim 1, further comprising:
   an urging member for urging said upper end flap so as to restore said upper end flap to a position where said upper end flap is located in a same plane as that of said back element.

10. The seat structure according to claim 9, wherein said urging member is a torsion spring attached to a pivot shaft of said upper end flap.

11. A nursery equipment, comprising said seat structure according to claim 1.

12. The nursery equipment according to claim 11, wherein said nursery equipment is a baby carriage.

* * * * *